United States Patent
Lee et al.

(10) Patent No.: US 12,519,133 B2
(45) Date of Patent: Jan. 6, 2026

(54) ELECTROLYTE SOLUTION FOR LITHIUM SECONDARY BATTERY AND LITHIUM SECONDARY BATTERY INCLUDING THE SAME

(71) Applicant: SK On Co., Ltd., Seoul (KR)

(72) Inventors: Jin Hong Lee, Daejeon (KR); Yu Na Shim, Daejeon (KR); In Haeng Cho, Daejeon (KR); Su Hee Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 351 days.

(21) Appl. No.: 17/535,016

(22) Filed: Nov. 24, 2021

(65) Prior Publication Data
US 2022/0173436 A1    Jun. 2, 2022

(30) Foreign Application Priority Data

Nov. 30, 2020    (KR) .......................... 10-2020-0164547

(51) Int. Cl.
*H01M 10/0567* (2010.01)
*H01M 10/0525* (2010.01)
*H01M 10/0569* (2010.01)

(52) U.S. Cl.
CPC ................ *H01M 10/0567* (2013.01); *H01M 10/0525* (2013.01); *H01M 10/0569* (2013.01); *H01M 2300/0051* (2013.01)

(58) Field of Classification Search
CPC ......... H01M 10/0567; H01M 10/0525; H01M 10/0569; H01M 2300/0051
See application file for complete search history.

(56) References Cited

U.S. PATENT DOCUMENTS

| | | |
|---|---|---|
| 2020/0036040 A1 | 1/2020 | Takai et al. |
| 2020/0185773 A1 | 6/2020 | Oh et al. |
| 2020/0365943 A1* | 11/2020 | Lin ................... H01M 10/0567 |
| 2021/0328266 A1 | 10/2021 | Kim et al. |

FOREIGN PATENT DOCUMENTS

| | | |
|---|---|---|
| CN | 1434536 A | 8/2003 |
| CN | 102694206 A | 9/2012 |
| CN | 109698314 A | 4/2019 |

(Continued)

OTHER PUBLICATIONS

Li et al., "Reversible Cycling of Graphite Electrodes in Propylene Carbonate Electrolytes Enabled by Ethyl Isothiocyanate", ACS Applied Materials & Interfaces, 2021, pp. 26023-26033, vol. 13, ACS Publications, American Chemical Society.

*Primary Examiner* — Nicholas A Smith
*Assistant Examiner* — Ziheng Lu
(74) *Attorney, Agent, or Firm* — The Webb Law Firm

(57) ABSTRACT

Provided is an electrolyte solution for a lithium secondary battery including an organic solvent, a lithium salt, an additive including at least one of isothiocyanate-based compounds represented by Chemical Formula 1 or Chemical Formula 2, and an auxiliary additive including at least one of a fluorine-containing carbonate-based compound, a lithium phosphate-based compound, a sultone-based compound, or a sulfate-based compound. A lithium secondary including the electrolyte solution is also provided.

9 Claims, 1 Drawing Sheet

(56) References Cited

FOREIGN PATENT DOCUMENTS

| | | | |
|---|---|---|---|
| JP | 2003026655 A | | 1/2003 |
| JP | 201061851 A | | 3/2010 |
| JP | 2012134137 A | * | 7/2012 |
| JP | 2016184462 A | | 10/2016 |
| KR | 1020150022658 A | | 3/2015 |
| KR | 1020160050871 A | | 5/2016 |
| KR | 1020160076192 A | | 6/2016 |
| KR | 1020170028676 A | | 3/2017 |
| KR | 1020190119615 A | | 10/2019 |
| KR | 1020200070802 A | | 6/2020 |
| KR | 1020200074902 A | | 6/2020 |

\* cited by examiner

ELECTROLYTE SOLUTION FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2020-0164547 filed Nov. 30, 2020, the disclosure of which is hereby incorporated by reference in its entirety.

BACKGROUND OF THE INVENTION

1. Field of the Invention

The present invention relates to an electrolyte solution for a lithium secondary battery and a lithium secondary battery including the same. More particularly, the present invention relates to an electrolyte solution for a lithium secondary battery including an organic solvent, a lithium salt and an additive, and a lithium secondary battery including the same.

2. Description of the Related Art

A secondary battery which can be charged and discharged repeatedly has been widely employed as a power source of a mobile electronic device such as a camcorder, a mobile phone, a laptop computer.

A lithium secondary battery is highlighted and developed among various types of secondary batteries due to high operational voltage and energy density per unit weight, a high charging rate, a compact dimension, etc.

For example, the lithium secondary battery may include an electrode assembly including a cathode, an anode and a separation layer, and an electrolyte solution immersing the electrode assembly.

The lithium secondary battery may further include an outer case having, e.g., a pouch shape for accommodating the electrode assembly and electrolyte solution.

For example, the cathode of the lithium secondary batteries may be fabricated by coating, drying and pressing a cathode slurry including a cathode active material, a binder, a conductive material, etc., on a cathode current collector.

The cathode active material may be a material capable of reversibly intercalating and de-intercalating lithium ions. For example, the cathode active material may include a lithium metal oxide including a metal element such as nickel (Ni), cobalt (Co), or manganese (Mn).

Recently, as an application of the lithium secondary battery is expanded, improved life-span, capacity and operation stability are required. Accordingly, developments of the lithium secondary battery capable of providing uniform power and capacity even in repeated charging and discharging.

However, power and capacity may be degraded due to surface damages of a nickel-based lithium metal oxide during the repeated charging and discharging, and a side reaction between the nickel-based lithium metal oxide and the electrolyte solution may be caused.

For example, in Korean Published Patent Application No. 10-2019-0119615, an additive is included in an electrolyte solution for a lithium secondary battery to enhance performance of the lithium secondary battery.

SUMMARY OF THE INVENTION

According to an aspect of the present invention, there is provided an electrolyte solution for a lithium secondary battery providing improved chemical stability in a lithium secondary battery.

According to an aspect of the present invention, there is provided a lithium secondary battery having improved chemical stability.

An electrolyte solution for a lithium secondary battery according to exemplary embodiments includes an organic solvent, a lithium salt, an additive including at least one of isothiocyanate-based compounds represented by Chemical Formula 1 or Chemical Formula 2, and an auxiliary additive comprising at least one selected from the group consisting of a fluorine-containing carbonate-based compound, a lithium phosphate-based compound, a sultone-based compound and a sulfate-based compound.

[Chemical Formula 1]

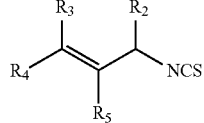
[Chemical Formula 2]

In Chemical Formula 1, $R_1$ is a substituted or unsubstituted C1-C6 linear or branched alkyl group, or a substituted or unsubstituted C3-C6 cycloalkyl group.

In Chemical Formula 2, $R_2$, $R_3$, $R_4$ and $R_5$ are each independently hydrogen, a substituted or unsubstituted C1-C6 linear or branched alkyl group or a substituted or unsubstituted C3-C6 cycloalkyl group, and at least two of $R_2$ to $R_5$ are capable of being connected to each other to form a ring.

In some embodiments, the additive may include both an isothiocyanate-based compound represented by Chemical Formula 1 and an isothiocyanate-based compound represented by Chemical Formula 2.

In some embodiments, $R_1$ may be an unsubstituted C1-C6 linear or branched alkyl group.

In some embodiments, $R_2$ may be hydrogen.

In some embodiments, $R_1$ may be a methyl group or an ethyl group, and $R_2$, $R_3$, $R_4$ and $R_5$ may be hydrogen.

In some embodiments, the fluorine-containing carbonate-based compound has a ring structure.

In some embodiments, the lithium phosphate-based compound may include a fluorine-containing lithium phosphate-based compound.

In some embodiments, the sultone-based compound may include an alkyl sultone-based compound and an alkenyl sultone-based compound.

In some embodiments, the fluorine-containing carbonate-based compound may include fluoroethylene carbonate. The lithium phosphate-based compound may include lithium difluorophosphate. The sultone-based compound may include 1,3-propane sultone, 1,4-butane sultone, ethene sultone, 1,3-propene sultone, 1,4-butene sultone and/or 1-methyl-1,3-propene sultone. The sulfate-based compound may include ethylene sulfate, trimethylene sulfate and/or methyltrimethylene sulfate.

In some embodiments, the additive may be included in an amount from 0.5 wt % to 2 wt % based on a total weight of the electrolyte solution.

In some embodiments, the auxiliary additive may be included in an amount from 1 wt % to 5 wt % based on a total weight of the electrolyte.

In some embodiments, a weight ratio of the auxiliary additive relative to the additive in the electrolyte solution may be from 1 to 5.

A lithium secondary battery according to exemplary embodiments includes an electrode assembly including an anode and a cathode facing the anode, and the electrolyte solution for a lithium secondary battery according to embodiments as described above impregnated with the electrode assembly.

According to exemplary embodiments, a swelling phenomenon caused during charging and discharging may be prevented by using the electrolyte solution for a lithium secondary battery.

A lithium secondary battery according to exemplary embodiments may include the electrolyte solution for a lithium secondary battery. Accordingly, the lithium secondary battery may have improved capacity retention and life-span while suppressing a thickness increase at high temperature environment.

DESCRIPTION OF THE INVENTION

Figure 1:
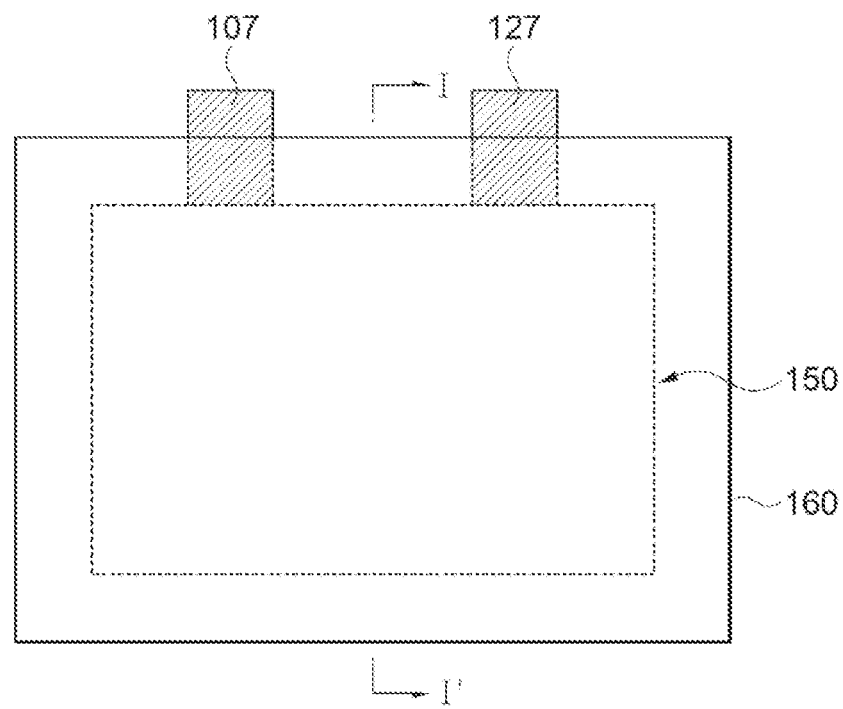
FIG. 1 is a schematic top planar view, respectively, illustrating a lithium secondary battery in accordance with exemplary embodiments.

According to example embodiments of the present invention, an electrolyte solution a lithium secondary battery including an additive of a predetermined chemical structure is provided. According to exemplary embodiments of the present invention, a lithium secondary battery including the electrolyte solution is also provided.

Hereinafter, the present invention will be described in detail with reference to examples and the accompanying drawings. However, those skilled in the art will appreciate that such embodiments described with reference to the examples and the drawings are provided to further understand the spirit of the present invention and do not limit subject matters to be protected as disclosed in the detailed description and appended claims.

The term "A-based compound" used herein may refer to a compound including a moiety expressed by "A" as a backbone or a substituent. For example, "isothiocyanate-based compound" may be a compound in which an isothiocyanate moiety is included in a backbone or an isothiocyanate group is bonded to the backbone as a substituent.

The term "Ca-Cb" used herein may indicate that the number of carbon atoms is from a to b.

<Electrolyte Solution for Lithium Secondary Battery>

An electrolyte solution for a lithium secondary battery (hereinafter, that may be abbreviated as an electrolyte solution) according to exemplary embodiments may include an organic solvent, a lithium salt and an additive.

In exemplary embodiments, the additive may include at least one of isothiocyanate-based compounds represented by Chemical Formula 1 or the following Chemical Formula 2 below.

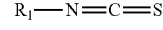

[Chemical Formula 1]

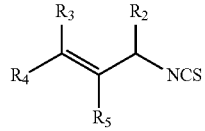

[Formula 2]

In Chemical Formula 1, $R_1$ may be a substituted or unsubstituted C1-C6 linear or branched alkyl group, or a substituted or unsubstituted C3-C6 cycloalkyl group.

In Chemical Formula 2, $R_2$, $R_3$, $R_4$ and $R_5$ may each independently be hydrogen, a substituted or unsubstituted C1-C6 linear or branched alkyl group, or a substituted or unsubstituted C3-C6 cycloalkyl group. In an embodiment, at least two of $R_2$ to $R_5$ may be connected to each other to form a ring.

For example, the branched alkyl group may be a C3-C6 alkyl group.

In some embodiments, $R_1$ to $R_5$ may include a substituent. For example, the substituent may include at least one of halogen, a C1-C6 alkyl group, a C3-C6 cycloalkyl group, a C1-C6 alkoxy group, a 3-7 membered heterocycloalkyl group, a hydroxy group (—OH), —$NR_6R_7$($R_6$ and $R_7$ are each independently hydrogen or a C1-C6 alkyl group), a nitro group (—$NO_2$), a cyano group (—CN), a thiocyanate group (—SCN), and an isothiocyanate group (—NCS).

The above-described additive may be added in the electrolyte solution, so that high-temperature storage properties may be improved. For example, improved capacity retention and capacity recovery may be achieved while suppressing an increase of a battery thickness and an internal resistance during the high-temperature storage In an embodiment, the additive may include both the isothiocyanate-based compound represented by Chemical Formula 1 and the isothiocyanate-based compound represented by Chemical Formula 2. In this case, the high-temperature storage properties of the lithium secondary battery may be further improved.

In an embodiment, in Chemical Formula 1, $R_1$ may be an unsubstituted C1-C6 linear or branched alkyl group.

In an embodiment, in Chemical Formula 2, $R_2$ may be hydrogen.

In an embodiment, in Chemical Formula 1, $R_1$ may be a methyl group or an ethyl group, and in Chemical Formula 2, $R_2$, $R_3$, $R_4$ and $R_5$ may be hydrogen.

In an embodiment, the additive may be included in an amount from 0.5 weight percent (wt %) to 2 wt % based on a total weight of the electrolyte solution. Within the above range, the high-temperature storage properties of the lithium secondary battery may be further improved.

In an embodiment, the electrolyte solution may further include an auxiliary additive that may include a fluorine-containing carbonate-based compound, a lithium phosphate-based compound, a sultone-based compound and a sulfate-based compound. The additive and the auxiliary additive may be used in a combination, the lithium secondary battery having improved the high-temperature storage properties may be efficiently provided.

For example, the fluorine-containing carbonate-based compound may include a fluorine atom or a fluorine-combined substituent (e.g., a fluorine-substituted alkyl group such as —$CF_3$) combined with at least one carbon atom in a carbonate-based compound.

In some embodiments, the fluorine-containing carbonate-based compound may include a fluorine-containing cyclic carbonate-based compound having a ring structure. For example, the fluorine-containing cyclic carbonate-based compound may have a 5-7 membered cyclic structure.

For example, the fluorine-containing cyclic carbonate-based compound may include fluoroethylene carbonate (FEC).

In an embodiment, the lithium phosphate-based compound may include a fluorine-containing lithium phosphate-based compound.

For example, the fluorine-containing lithium phosphate compound may include a fluorine atom or a fluorine-combined substituent (e.g., a fluorine-substituted alkyl group such as —$CF_3$) combined with a phosphorous atom of a lithium phosphate-based compound.

In some embodiments, the fluorine-containing lithium phosphate-based compound may include at least one of lithium difluoro phosphate ($LiPO_2F_2$) and lithium difluoro (bisoxalato) phosphate.

In some embodiments, the sultone-based compound may include at least one of an alkyl sultone-based compound and an alkenyl sultone-based compound.

In some embodiments, the sultone-based compound may include both the alkyl sultone-based compound and the alkenyl sultone-based compound.

For example, the alkyl sultone-based compound may include at least one of 1,3-propane sultone (PS) and 1,4-butane sultone.

For example, the alkenyl sultone-based compound may include at least one of ethenesultone, 1,3-propene sultone (PRS), 1,4-butene sultone and 1-methyl-1,3-propene sultone.

In some embodiments, the sulfate-based compound may include a cyclic sulfate-based compound including a ring structure. The cyclic sulfate-based compound may have a 5-7 membered cyclic structure.

For example, the cyclic sulfate-based compound may include at least one of ethylene sulfate (ESA), trimethylene sulfate (TMS) and methyltrimethylene sulfate (MTMS).

In an embodiment, the auxiliary additive may be included in an amount from 1 wt % to 5 wt % based on a total weight of the electrolyte solution. Within the above range, the high-temperature storage properties of the lithium secondary battery may be further improved.

In an embodiment, a weight ratio of the auxiliary additive relative to the additive in the electrolyte solution may be from 1 to 5, preferably from 1.75 to 4.75, more preferably from 2 to 4.5. Within the above range, high-temperature storage properties of the lithium secondary battery may be further improved.

In an embodiment, the auxiliary additive may further include at least one of a borate-based compound, a nitrile-based compound, an amine-based compound, a silane-based compound and a benzene-based compound.

For example, the borate-based compound may include at least one of lithium tetraphenyl borate and lithium difluoro (oxalato) borate (LiODFB).

For example, the nitrile-based compound may include succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile and 4-fluorophenylacetonitrile.

For example, the organic solvent may include, e.g., an organic compound that may provide a sufficient solubility for the lithium salt, the additive and the auxiliary additive and may not have a reactivity in the battery.

In an embodiment, the organic solvent may include a carbonate-based solvent, an ester-based solvent, an ether-based solvent, a ketone-based solvent, an alcohol-based solvent, an aprotic solvent, or the like. These may be used alone or in combination of therefrom.

The carbonate-based solvent may include, e.g., dimethyl carbonate (DMC), ethyl methyl carbonate (EMC), diethyl carbonate (DEC), methyl propyl carbonate, ethyl propyl carbonate, dipropyl carbonate, ethylene carbonate (EC), propylene carbonate (PC), butylene carbonate, etc. These may be used alone or in combination of therefrom.

The ester-based solvent may include, e.g., methyl acetate (MA), ethyl acetate (EA), n-propyl acetate (n-PA), 1,1-dimethylethyl acetate (DMEA), methyl propionate (MP), ethyl propionate (EP), gamma-butyrolactone (GBL), decanolide, valerolactone, mevalonolactone, caprolactone, etc. These may be used alone or in combination of therefrom.

The ether-based solvent may include, e.g., dibutyl ether, tetraethylene glycol dimethyl ether (TEGDME), diethylene glycol dimethyl ether (DEGDME), dimethoxyethane, tetrahydrofuran (THF), 2-methyltetrahydrofuran, etc. These may be used alone or in combination of therefrom.

The ketone-based solvent may include, e.g., cyclohexanone.

The alcohol-based solvent may include, e.g., ethyl alcohol, isopropyl alcohol, etc.

The aprotic solvent may include, e.g., a nitrile-based solvent, an amide-based solvent (e.g., dimethylformamide), a dioxolane-based solvent (e.g., 1,3-dioxolane), sulfolane, etc. These may be used alone or in combination of therefrom.

In some embodiments, the organic solvent may include the carbonate-based solvent. For example, the organic solvent may include at least one of ethylene carbonate (EC), ethylmethyl carbonate (EMC), dimethyl carbonate (DMC) and diethyl carbonate (DEC).

The electrolyte solution may include the lithium salt, and the lithium salt may be represented by $Li^+X^-$.

The anion ($X^-$) of the lithium salt may include, e.g., $F^-$, $Cl^-$, $Br^-$, $I^-$, $NO_3^-$, $N(CN)_2^-$, $BF_4^-$, $ClO_4^-$, $PF_6^-$, $SbF_6^-$, $AsF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc. These may be used alone or in a combination thereof.

In some embodiments, the lithium salt may include at least one of $LiBF_4$ and $LiPF_6$.

In an embodiment, the lithium salt may be included in a concentration from about 0.01 M to about 5 M, preferably from about 0.01 M to 2 M with respect to the organic solvent. Within the above range, a transfer of lithium ions and/or electrons may be promoted during charging and discharging of the lithium secondary battery.

<Lithium Secondary Battery>

Figure 2:
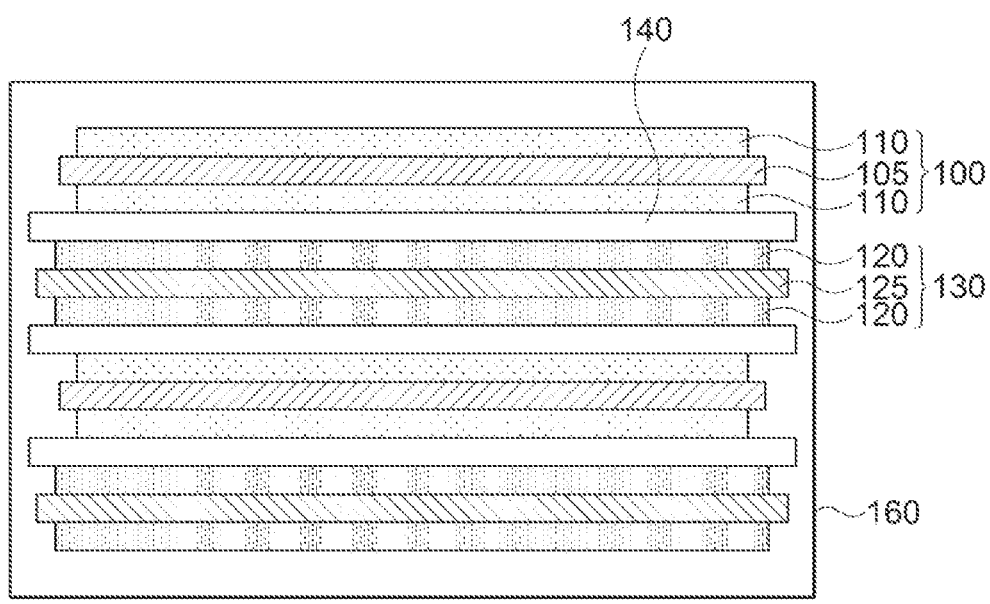
FIG. 2 is a schematic cross-sectional view illustrating a lithium secondary battery in accordance with exemplary embodiments.

FIGS. 1 and 2 are a schematic top planar view and a schematic cross-sectional view, respectively, illustrating a lithium secondary battery in accordance with exemplary embodiments. Specifically, FIG. 2 is a cross-sectional view taken along line I-I' of FIG. 1.

Referring to FIGS. 1 and 2, a lithium secondary battery may include an electrode assembly 150 including a cathode 100, an anode 130 and a separation layer 140 interposed between the cathode and the anode. The electrode assembly 150 may be accommodated in a case 160 together with the electrolyte solution according to the above-described exemplary embodiments to be impregnated therein.

The cathode 100 may include a cathode current collector 105 and a cathode active material layer 110 formed on the cathode current collector 105.

For example, the cathode active material layer 110 may include a cathode active material layer and a binder, and may further include a conductive material.

For example, a cathode slurry may be prepared by mixing and stirring the cathode active material in a solvent with the binder, the conductive material, a dispersive agent, etc. The slurry may be coated on the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used.

The cathode active material may be a material capable of reversibly intercalating and de-intercalating lithium ions. The cathode active material may include, e.g., a lithium metal oxide including a metal element such as nickel, cobalt, manganese, aluminum, etc.

For example, the lithium metal oxide may be represented by Chemical Formula 3 below.

  [Chemical Formula 3]

$$Li_xNi_aCo_bM_cO_y$$

In Chemical Formula 3, M is at least one of Al, Zr, Ti, Cr, B, Mg, Mn, Ba, Si, Y, W, and Sr, and $0.9 \leq x \leq 1.2$, $1.9 \leq y \leq 2.1$, $0.5 \leq a \leq 1$, $0 \leq c/(a+b) \leq 0.13$.

For example, in Chemical Formula 3, $0 \leq c \leq 0.11$.

In some embodiments, a content of nickel in the lithium metal oxide among elements other than lithium and oxygen may be 60 mol % or more, preferably 70 mol % or more, more preferably 80 mol % or more, 83 mol % or more, or 85 mol % or more For example, in Chemical Formula 3, $0.6 \leq a \leq 1$, and more preferably $0.8 \leq a \leq 1$.

In some embodiments, the above-described cathode active material or the lithium metal oxide may further include a coating element or a doping element. For example, the coating element or the doping element may include Al, Ti, Ba, Zr, Si, B, Mg, P, Sr, W, La, an alloy thereof or an oxide thereof. These may be used alone or in combination therefrom. The cathode active material may be passivated by the coating element or the doping element, so that stability with respect to a penetration by an external object and life-span may be further improved.

When the content of nickel in the lithium metal oxide is increased, relatively chemical stability, for example, high temperature storage properties may be deteriorated. However, in the case of the battery including the electrolyte solution according to exemplary embodiments, improved high-temperature storage properties may be implemented even when the high-nickel lithium metal oxide (e.g., 80 mol % of Ni) is included.

The binder for the cathode may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

The conductive material may include a carbon-based material such as graphite, carbon black, graphene, carbon nanotube, etc., and/or a metal-based material such as tin, tin oxide, titanium oxide, a perovskite material such as LaSrCoO₃ or LaSrMnO₃, etc.

The anode 130 may include an anode current collector 125 and an anode active material layer 120 on the anode current collector 125.

The anode active material layer 120 may include an anode active material and an anode binder, and may further include a conductive material.

For example, the anode active material may be mixed and stirred together with the anode binder, the conductive material in a solvent to form an anode slurry. The anode slurry may be coated on the anode current collector 125, dried and pressed to obtain the anode 130.

For example. the anode current collector 125 may include gold, stainless-steel, nickel, aluminum, titanium, copper or an alloy thereof, preferably, may include copper or a copper alloy.

The anode active material may include a material which may be capable of adsorbing and ejecting lithium ions. For example, a carbon-based material such as a crystalline carbon, an amorphous carbon, a carbon complex or a carbon fiber, a lithium alloy, silicon-based material, etc., may be used.

The amorphous carbon may include a hard carbon, cokes, a mesocarbon microbead (MCMB) fired at a temperature of 1500° C. or less, a mesophase pitch-based carbon fiber (MPCF), etc. The crystalline carbon may include an artificial graphite, natural graphite, graphitized cokes, graphitized MCMB, graphitized MPCF, etc.

The silicon-based material may include, e.g., Si, $SiO_x$ ($0 \leq x \leq 2$), Si/C, SiO/C, Si-metal, etc.

The lithium alloy may further include aluminum, zinc, bismuth, cadmium, antimony, silicon, lead, tin, gallium, indium, etc.

The binder and the conductive material substantially the same as or similar to those mentioned above may also be used in the anode. In some embodiments, the binder for forming the anode may include, e.g., an aqueous binder such as styrene-butadiene rubber (SBR) for compatibility with the carbon-based active material, and may be used together with a thickener such as carboxymethyl cellulose (CMC).

A separation layer 140 may be interposed between the cathode 100 and the anode 130. In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like.

The separation layer 140 may also include a non-woven fabric formed from a glass fiber with a high melting point, a polyethylene terephthalate fiber, or the like.

An electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or z-folding the separation layer 140.

The electrode assembly 150 may be accommodated together with the electrolyte solution according to exemplary embodiments in the case 160 to define a lithium secondary battery.

As illustrated in FIG. 1, an electrode tab (a cathode tab or an anode tab) may protrude from each of the cathode current collector 105 and the anode current collector 125 included in each electrode cell and may extend to one side of the case 160. The electrode tabs may be welded together to be connected to an electrode lead (an anode lead 107 or a cathode lead 127) extending to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

(1) Preparation of Electrolyte Solution 1.0 M solution of $LiPF_6$ (a mixed solvent of EC/EMC in a 25:75 volume ratio) was prepared.

Based on a total weight of an electrolyte solution, 1 wt % of allyl isothiocyanate (AITC) was added as an additive.

1 wt % of $LiPO_2F_2$ (W3), 1 wt % of fluoroethylene carbonate (FEC), 0.5 wt % of 1,3-propane sultone (PS), 0.5 wt % of 1,3-propene sultone (PRS) and 0.5 wt % of 1,2-ethylene sulfate (ESA) were added as an auxiliary additive and mixed to prepare the electrolyte solution of Example 1.

(2) Fabrication of Lithium Secondary Battery Sample

A cathode active material including $Li[Ni_{0.6}Co_{0.2}Mn_{0.2}]O_2$ and $Li[Ni_{0.8}Co_{0.1}Mn_{0.1}]O_2$ in a weight ratio of 6:4, a carbon black conductive material and a polyvinylidene fluoride (PVdF) binder were mixed in NMP by a weight ratio of 92:5:3 to prepare a cathode slurry.

The cathode slurry was uniformly coated on an area excluding a protrusion of an aluminum foil (thickness: 15 μm) having the protrusion (a cathode tab portion) on one side thereof, and then dried and presses to form a cathode.

An anode slurry was prepared by mixing an anode active material including artificial graphite and natural graphite in a weight ratio of 7:3, a styrene-butadiene rubber (SBR) binder and a carboxymethyl cellulose (CMC) thickener in a distilled water by a weight ratio of 97:1:2.

The anode slurry was uniformly coated on an area excluding a protrusion of a copper foil (thickness: 15 μm) having the protrusion (an anode tab portion) on one side thereof, and then dried and pressed to form an anode.

An electrode assembly was formed by interposing a polyethylene separator (thickness: 20 μm) between the cathode and the anode. A cathode lead and an anode lead were welded and connected to the cathode tab and the anode tab, respectively.

The electrode assembly was accommodated in a pouch (case) such that portions of the cathode lead and the anode lead were exposed to an outside, and three sides except for an electrolyte injection side were sealed.

The electrolyte solution prepared in the above (1) was injected, and electrolyte injection side was also sealed, and impregnated for 12 hours to fabricate a lithium secondary battery sample.

Example 2

A lithium secondary battery sample was fabricated by the same method as that in Example 1, except that 1 wt % of ethyl isothiocyanate (EITC) was added as the additive in the preparation of the electrolyte solution.

Example 3

A lithium secondary battery sample was fabricated by the same method as that in Example 1, except that 0.5 wt % of allyl isothiocyanate and 0.5 wt % of ethyl isothiocyanate were added as the additive in the preparation of the electrolyte solution.

Example 4

A lithium secondary battery sample was fabricated by the same method as that in Example 1, except that 0.5 wt % of $LiPO_2F_2$, 0.5 wt % of fluoroethylene carbonate, 0.25 wt % of 1,3-propane sultone, 0.25 wt % of 1,3-propene sultone and 0.25 wt % of 1,2-ethylene sulfate were added as the auxiliary additive in the preparation of the electrolyte solution.

Example 5

A lithium secondary battery sample was fabricated by the same method as that in Example 1, 1.25 wt % of $LiPO_2F_2$, 1.25 wt % of fluoroethylene carbonate, 0.75 wt % of 1,3-propane sultone, 0.75 wt % of 1,3-propene sultone and 0.75 wt % of 1,2-ethylene sulfate were added as the auxiliary additive in the preparation of the electrolyte solution.

Example 6

A lithium secondary battery sample was fabricated by the same method as that in Example 1, 1.25 wt % of $LiPO_2F_2$, 1.25 wt % of fluoroethylene carbonate, 0.75 wt % of 1,3-propane sultone, 1 wt % of 1,3-propene sultone and 1 wt % of 1,2-ethylene sulfate were added as the auxiliary additive in the preparation of the electrolyte solution.

Comparative Example 1

A lithium secondary battery sample was fabricated by the same method as that in Example 1, except that the additive was not added in the preparation of the electrolyte solution.

Comparative Example 2

A lithium secondary battery sample was fabricated by the same method as that in Example 1, except that 1 wt % of trimethylsilyl isothiocyanate (TMS-ITC) was added as the additive in the preparation of the electrolyte solution.

Comparative Example 3

A lithium secondary battery sample was fabricated by the same method as that in Example 1, except that 1 wt % of 4-fluorophenyl isothiocyanate (4-FP-ITC) was added as the additive in the preparation of the electrolyte solution.

Comparative Example 4

A lithium secondary battery sample was fabricated by the same method as that in Example 1, except that the auxiliary additive was not added in the preparation of the electrolyte solution.

Comparative Example 5

A lithium secondary battery sample was fabricated by the same method as that in Example 1, except that 1 wt % of LiPO$_2$F$_2$, 1 wt % of fluoroethylene carbonate, 0.5 wt % of 1,3-propane sultone, 0.5 wt % of 1,3-propene sultone and 1 wt % of LiBOB were added as the auxiliary additive in the preparation of the electrolyte solution.

Comparative Example 6

A lithium secondary battery sample was fabricated by the same method as that in Example 1, except that 1 wt % of LiPO$_2$F$_2$, 1 wt % of fluoroethylene carbonate, 0.5 wt % of 1,2-ethylene sulfate and 1 wt % of LiBOB were added as the auxiliary additive in the preparation of the electrolyte solution.

The components and contents of the additives and the auxiliary additives used in Examples and Comparative Examples are shown in Table 1 below.

TABLE 1

| | | Auxiliary Additive | | | | | | Additive: Auxiliary Additive |
|---|---|---|---|---|---|---|---|---|
| | Additive | W3 | FEC | PS | PRS | ESA | BOB | Weight Ratio |
| Example 1 | AITC | 1 | 1 | 0.5 | 0.5 | 0.5 | — | 1:3.5 |
| Example 2 | EITC | 1 | 1 | 0.5 | 0.5 | 0.5 | — | 1:3.5 |
| Example 3 | AITC + EITC | 1 | 1 | 0.5 | 0.5 | 0.5 | — | 1:3.5 |
| Example 4 | AITC | 0.5 | 0.5 | 0.25 | 0.25 | 0.25 | — | 1:1.75 |
| Example 5 | AITC | 1.25 | 1.25 | 0.75 | 0.75 | 0.75 | — | 1:4.75 |
| Example 6 | AITC | 1.25 | 1.25 | 0.75 | 1 | 1 | — | 1:5.25 |
| Comparative Example 1 | — | 1 | 1 | 0.5 | 0.5 | 0.5 | — | 1:3.5 |
| Comparative Example 2 | TMS-ITC | 1 | 1 | 0.5 | 0.5 | 0.5 | — | 1:3.5 |
| Comparative Example 3 | 4-FP-ITC | 1 | 1 | 0.5 | 0.5 | 0.5 | — | 1:3.5 |
| Comparative Example 4 | AITC | — | — | — | — | — | — | — |
| Comparative Example 5 | AITC | 1 | 1 | 0.5 | 0.5 | — | 1 | 1:4 |
| Comparative Example 6 | AITC | 1 | 1 | — | — | 0.5 | 1 | 1:3.5 |

Experimental Example 1: Evaluation on Initial Properties (Room Temperature, 25° C.)

(1) Evaluation on Initial Capacity

The secondary batteries of Examples and Comparative Examples were charged (0.5 C-rate CC/CV; 4.2V, 0.05 C cut-off) and discharged (0.5 C-rate CC; 2.7V cut-off) three times. A discharge capacity at the third cycle was measured as an initial capacity C1 of the battery.

(2) Evaluation on Initial Thickness of Battery

The batteries of Examples and Comparative Examples were charged (0.5 C-rate CC/CV; 4.2V, 0.05 C cut-off) at room temperature, and then an initial thickness T1 of the battery was measured using a plate thickness measuring device (Mitutoyo, 543-490B).

(3) Evaluation on Internal Resistance (DCIR)

At an SOC 60% point, C-rate was changed to 0.2 C, 0.5 C, 1.0 C, 1.5 C, 2.0 C, 2.5 C and 3.0 C, and charging and discharging at the corresponding C-rate were performed for 10 seconds. A voltage termination point during the charging and discharging was included in a linear equation, and a slope of the equation was measured as DCIR.

Experimental Example 2: Evaluation on Storage Property at High Temperature

The batteries of Examples and Comparative Examples were left to be exposed to an air at 60° C. for 3 weeks using a thermostat, and further were left at room temperature for 30 minutes. Thereafter, properties after storage at high temperature were evaluated as follows.

(1) Evaluation on Battery Thickness after High-Temperature Storage

After charging the batteries of Examples and Comparative Examples were stored at the high temperature, thicknesses T2 of the batteries were measured using a plate thickness measuring device (Mitutoyo, 543-490B).

An increasing ratio of a thickness after the high temperature storage was calculated as follows.

Increasing Ratio of Thickness=$(T2-T1)/T1\times100(\%)$ (2) Evaluation of Capacity Retention (Ret) Evaluation after High Temperature Storage The charged batteries of Examples and Comparative Examples were stored at the high temperature, and a 0.5 C-rate CC discharge (2.7V cut-off) was performed to measure a discharge capacity C2.

The capacity retention was calculated as follows.

Capacity retention after high temperature storage (%)=$C2/C1\times100(\%)$ (3) Evaluation of Capacity Recovery (Rec) after High Temperature Storage After measuring the capacity retention according to the above (2) for the batteries of Examples and Comparative Examples, 0.5 C-rate CC/CV charge (4.2V, 0.05 C cut-off) and 0.5 C-rate CC discharge (2.7V cut-off) were performed to measure a discharge capacity C3.

The capacity recovery was calculated as follows.

Capacity recovery after high temperature storage (%)=$C3/C1\times100(\%)$ (4) Evaluation of Internal Resistance (DCIR) after High Temperature Storage After the high temperature storage, DCIR was measured as described in (3) of Experimental Example 1.

The measurement results are shown in Tables 2 and 3 below.

TABLE 2

|  |  | Example 1 | Example 2 | Example 3 | Example 4 | Example 5 | Example 6 |
|---|---|---|---|---|---|---|---|
| Initial Property | Capacity (mAh) | 1738 | 1735 | 1738 | 1730 | 1729 | 1733 |
|  | Thickness (mm) | 5.40 | 5.39 | 5.197 | 5.203 | 5.177 | 5.056 |
|  | DCIR (mΩ) | 37.1 | 36.9 | 35.7 | 37.5 | 37.9 | 36.4 |
| After high temperature storage | Thickness (mm) | 5.51 | 5.55 | 5.288 | 5.301 | 5.30 | 5.177 |
|  | Increasing ratio of thickness (%) | 2.04 | 2.96 | 1.75 | 1.89 | 2.33 | 2.39 |
|  | DCIR (mΩ) | 38.3 | 39.5 | 36.8 | 38.1 | 40.1 | 42.8 |
|  | Ret(%) | 94 | 93 | 94 | 94 | 91 | 89 |
|  | Rec(%) | 93 | 92 | 93 | 92 | 89 | 88 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Initial Property | Capacity (mAh) | 1741 | 1729 | 1734 | 1740 | 1692 | 1701 |
|  | Thickness (mm) | 5.36 | 5.43 | 5.48 | 5.31 | 5.45 | 5.55 |
|  | DCIR (mΩ) | 37.3 | 37.8 | 38.2 | 35.5 | 36.9 | 39.6 |
| After high temperature storage | Thickness (mm) | 5.54 | 5.63 | 5.61 | 5.85 | 5.841 | 5.916 |
|  | Increasing ratio of thickness (%) | 3.35 | 3.68 | 2.37 | 10.1 | 7.71 | 6.59 |
|  | DCIR (mΩ) | 41.0 | 43.8 | 39.8 | 42.1 | 45.0 | 46.1 |
|  | Ret(%) | 89 | 91 | 88 | 87 | 86 | 85 |
|  | Rec(%) | 90 | 90 | 86 | 89 | 87 | 86 |

Referring to Tables 1 and 2, the secondary batteries of Examples provided improved high-temperature storage properties (e.g., increase of the capacity retention and the capacity recovery, and an inhibition of thickness and resistance increase) compared to those from the secondary batteries of Comparative Examples 1 to 3.

In Comparative Examples 4 to 6 where the auxiliary additive was not included or the auxiliary additives having a different combination from that of Example 1 were used, the high temperature storage properties were degraded.

Referring to Example 3, a combination of allyl isothiocyanate and ethyl isothiocyanate was used as the to further improve the high temperature storage properties.

Referring to Examples 1, 4, 5, and 6, when the weight ratio of the auxiliary additive relative to the additive in the electrolyte solution was within a specific numerical range, more improved high-temperature storage properties were provided.

What is claimed is:

1. An electrolyte solution for a lithium secondary battery, comprising:
   an organic solvent;
   a lithium salt;
   an additive comprising allyl isothiocyanate and ethyl isothiocyanate; and
   an auxiliary additive comprising a fluorine-containing carbonate-based compound, a lithium phosphate-based compound, a sultone-based compound and a sulfate-based compound,
   wherein a weight ratio of the auxiliary additive relative to the additive in the electrolyte solution is from 1.75 to 5.

2. The electrolyte solution for a lithium secondary battery according to claim 1, wherein the fluorine-containing carbonate-based compound has a ring structure.

3. The electrolyte solution for a lithium secondary battery according to claim 1, wherein the lithium phosphate-based compound comprises a fluorine-containing lithium phosphate-based compound.

4. The electrolyte solution for a lithium secondary battery according to claim 1, wherein the sultone-based compound comprises an alkyl sultone-based compound and an alkenyl sultone-based compound.

5. The electrolyte solution for a lithium secondary battery according to claim 1, wherein the fluorine-containing carbonate-based compound comprises fluoroethylene carbonate, the lithium phosphate-based compound comprises lithium difluorophosphate, the sultone-based compound comprises at least one selected from the group consisting of 1,3-propane sultone, 1,4-butane sultone, ethene sultone, 1,3-propene sultone, 1,4-butene sultone and 1-methyl-1,3-propene sultone, and the sulfate-based compound comprises at least one selected from the group consisting of ethylene sulfate, trimethylene sulfate and methyltrimethylene sulfate.

6. The electrolyte solution for a lithium secondary battery according to claim 1, wherein the additive is comprised in an amount from 0.5 wt % to 2 wt % based on a total weight of the electrolyte solution.

7. The electrolyte solution for a lithium secondary battery according to claim 1, wherein the auxiliary additive is comprised in an amount from 1 wt % to 5 wt % based on a total weight of the electrolyte.

8. The electrolyte solution for a lithium secondary battery according to claim 1, wherein a weight ratio of the auxiliary additive relative to the additive in the electrolyte solution is from 2 to 4.

9. A lithium secondary battery comprising:

an electrode assembly comprising an anode and a cathode facing the anode, wherein the electrode assembly is impregnated with the electrolyte solution for a lithium secondary battery according to claim 1.

* * * * *